Figure 1:
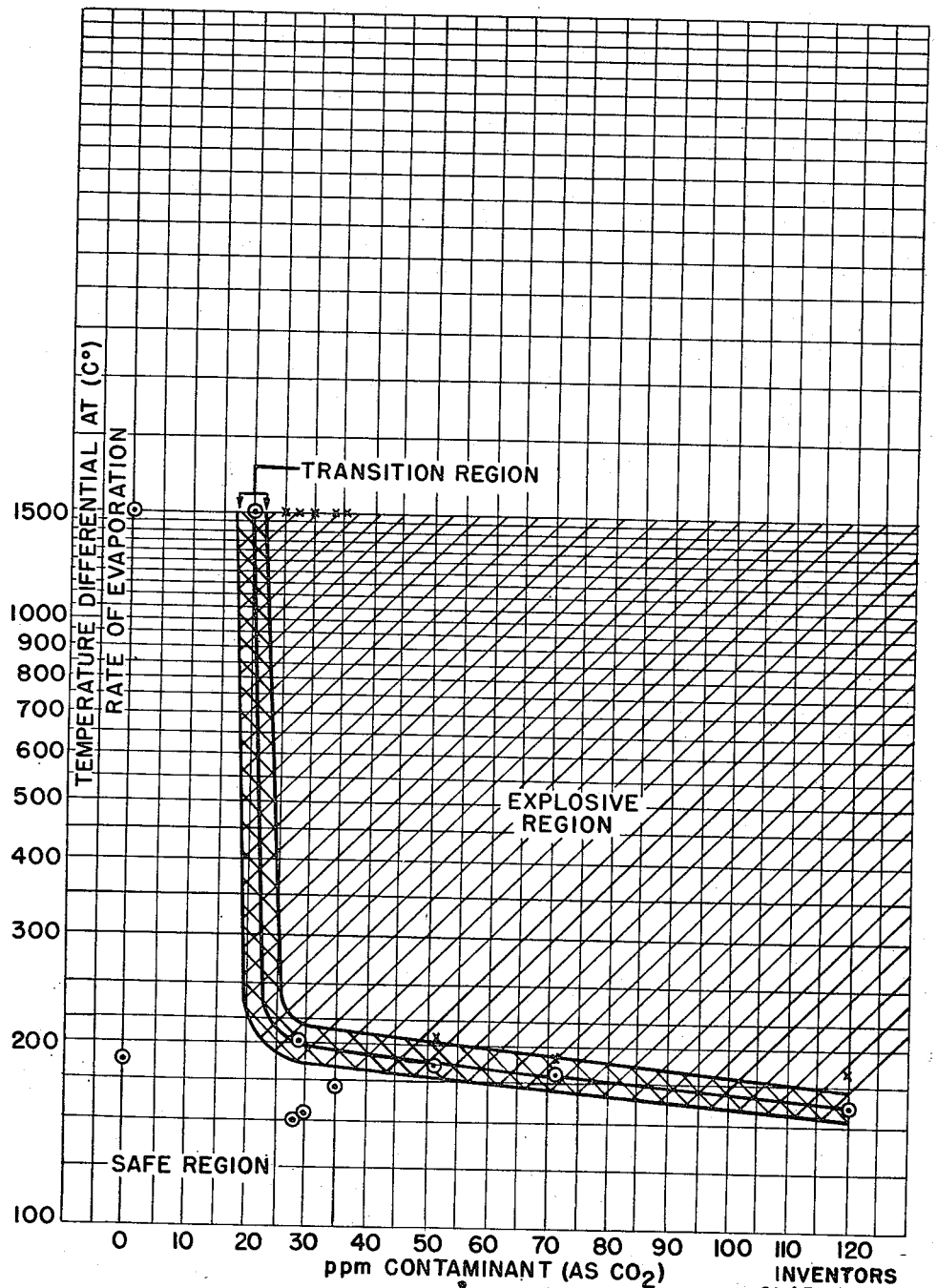

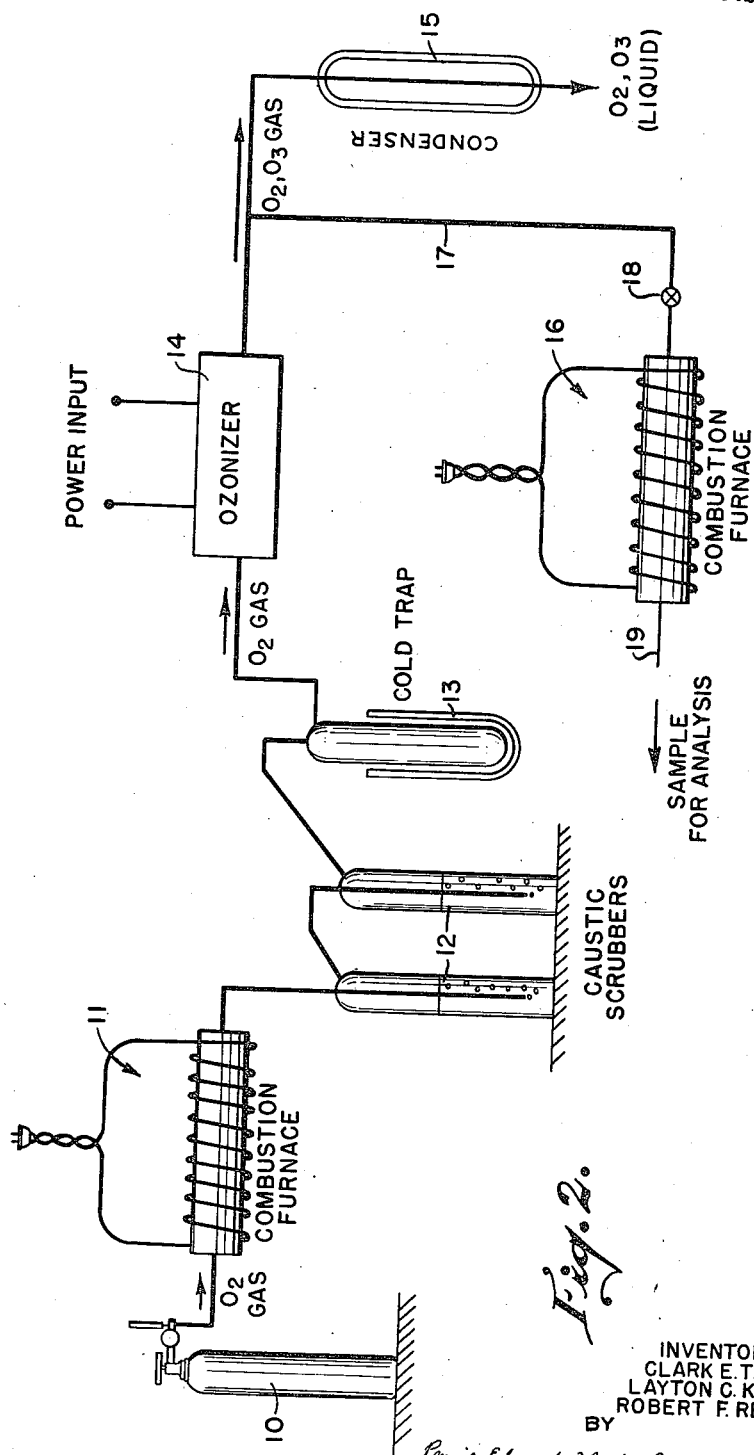

United States Patent Office 2,700,648
Patented Jan. 25, 1955

2,700,648

OZONE STABILIZATION

Clark E. Thorp, Layton C. Kinney, and Robert F. Remaly, Chicago, Ill., assignors, by mesne assignments, to Air Reduction Company, Incorporated, New York, N. Y., a corporation of New York Application January 19, 1951, Serial No. 206,748

6 Claims. (Cl. 204—176)

This invention relates to the production and handling of ozone, and especially to the stabilization of ozone.

In connection with the production and handling of concentrated liquid and gaseous ozone severe explosions have frequently been encountered but the cause thereof has not been heretofore understood. The resulting damage to apparatus and danger to personnel have interfered considerably with the commercial and other potential uses of ozone. We have discovered that the explosions are caused or accelerated by contaminants in the gas containing free oxygen from which the ozone is generated and that such contaminants are of a volatile and oxidizable nature.

It is the object of this invention to decrease or to eliminate the explosion hazard in the production and handling of concentrated liquid and gaseous ozone. By means of the invention oxygen or gas containing free oxygen from which the ozone is generated is first purified by the removal therefrom of combustible or oxidizable contaminants which, although present in very small proportions have been found to cause the explosions as the result of exothermic reactions.

The invention will be better understood from the following description considered in connection with the accompanying drawings, wherein:

Fig. 1 represents graphically the effect of contaminant concentration upon the explosion sensitivity of concentrated liquid ozone at different temperatures or rates of evaporation; and Fig. 2 illustrates in flow sheet form the preferred apparatus and method for removing the detonation-inducing contaminants from the oxygen-containing gas from which the ozone is generated.

In accordance with the present invention it has been found that one such contaminant is gaseous hydrocarbon such as acetylene, but that even after the removal of acetylene, usually by adsorption on silica gel at low temperature, additional unadsorbed contaminants may remain in quantities sufficient to cause explosions. These contaminants are believed to comprise combustible materials which generally include hydrocarbons and organic compounds which are capable of sensitizing the liquid ozone to detonation point. A trace of lubricating oil is a serious cause of contamination. Although all of the contaminating materials have not been positively identified it has been found that they can be removed by oxidation.

As a result of a series of tests and measurements it has been discovered that the explosion sensitivity of concentrated ozone, whether in liquid or gaseous form, is related to the proportion of contaminant present, and also to the temperature, or the rate at which the liquid ozone is vaporized. In general, the tendency toward explosion decreases as the proportion of contaminant decreases and also as the temperature or rate of exaporation decreases. The relation of these two variables is illustrated in Fig. 1 which shows, in the case of liquid ozone, that as the rate of evaporation becomes lower the permissible contaminant concentration becomes higher. The proportion of contaminant is expressed as parts per million (p. p. m.), by weight of contaminant in terms of carbon dioxide ($CO_2$) calculated on the mixture. The rate of evaporation is expressed in terms of temperature differential, in degrees centigrade (° C.), between the lower heated surface of a clean aluminum cup and the boiling temperature of liquid ozone (—112° C.) contained in the cup. Evaporation from a glass surface shows stability, viz., freedom from detonation, with slight increase in contaminant concentration.

The curve indicates that a concentration of approximately 20 p. p. m. of contaminant is the maximum permissible or critical limit to avoid danger of explosion, inasmuch as the actual rate of evaporation due to accident, such as spilling or mishandling, cannot be predicted. However, the tests also indicate the existence of a transition region (probably due to experimental error) of approximately 5 p. p. m. and of approximately 30° temperature differential between the "safe" and the "explosive" regions. It is obviously advisable to reduce the proportion of oxidizable contaminant to a value sufficiently low to be safe regardless of the temperature or rate of evaporation. This, as the graph of Fig. 1 shows, is less than 20 p. p. m. and preferably less than 15 p. p. m. in respect to concentrated liquid ozone. In the case of concentrated gaseous ozone (not illustrated) we have found that the safe or critical limit does not exceed approximately 5 p. p. m., and that to achieve a maximum safety factor (whether in connection with liquid or gaseous ozone) the apparatus producing the ozone should be so arranged and operated that substantially no (viz., less than approximately 5 p. p. m.) combustible compounds or contaminants remain in the oxygen-containing gas which is supplied to the ozonizer.

The method in accordance with the invention is illustrated in Fig. 2 which represents a flow sheet diagram of a system for generating stable ozone by greatly reducing the degree of oxidizable impurities in the oxygen or oxygen-containing gas, passing the treated gas into an ozonizer and condensing the resulting ozone to form liquid ozone. The oxygen-containing gas is here represented as supplied by a cylinder 10 of liquefied oxygen. Oxygen of "commercially pure" grade is suitable, because even "chemically pure" oxygen is likely to contain oxidizable hydrocarbons in quantity sufficient to induce detonation of the ozone. The oxygen is then passed into a combustion furnace 11. This furnace may be of well known type and is here represented as being electrically heated. The furnace should be packed with an oxidizing catalyst such as copper oxide, silver oxide, magnesium dioxide or platinum black. Quartz pebbles have also been successfully employed, but this form of catalyst is not so efficient as the others above named. The quartz increases heat conduction from the furnace walls and increases the heated area in contact with the gas.

The furnace should be operated at an elevated temperature, each catalyst having a minimum temperature at which it is effective. Consequently, operation considerably above this minimum temperature is advisable; and the maximum flow rate will be related to the chosen temperature. In the case of copper oxide, the minimum operating temperature should be between approximately 600° C. and 1,000° C., an average temperature of 900° C. having been found satisfactory to remove all oxidizable compounds. The flow rate should be such that at the operating temperature the required amount of contaminant will be oxidized; and this can be ascertained by analysis in connection with any particular apparatus.

By heating the oxygen and the contaminants in a combustion furnace in the presence of a suitable oxidizing catalyst, the contaminants are oxidized to an oxide of carbon, normally carbon dioxide, because of the presence of an excess of oxygen. This carbon dioxide is then removed by suitable absorbers or scrubbers 12, here represented as scrubbers of the caustic type containing sodium hydroxide or soda-lime. After passing through the scrubbers, the oxygen freed of carbon dioxide passes through a drier or cold trap 13 to remove all water vapor from the gas. A suitable cold trap comprises a vessel having surfaces in contact with the gas maintained at the temperature of boiling liquid oxygen. The removal of carbon dioxide and water vapor prevents formation of rime in the ozone condenser and is therefore desirable, although the presence of either or both does not appear to affect the stability (viz., tendency to detonate) of the ozone.

The oxygen-containing gas from which the combustible materials (and also the products of combustion) have been removed, is then passed into the ozonizer 14. This ozonizer may be of any suitable type, and, for example, may be constructed as described in copending U. S. Letters Patent 2,615,841 of Thorp and Panula, Serial No. 37,730, filed July 8, 1948, granted October 28, 1952. A desired degree of concentration may be had by recirculating the product through the ozonizer, as mentioned in column 8 of the patent, or by other means well known in the art such as condensing, and possibly both.

After the ozone has been generated it may be condensed or liquefied in a suitable condenser 15. The concentrated liquid ozone thus produced, being substantially free from oxidizable substances, will not detonate and will be wholly safe to handle for commercial purposes or otherwise. To permit a check, when required, of the completeness of oxidation of the contaminant materials in combustion furnace 11, or to check on the unintentional introduction of contaminant at the ozonizer or prior to the condenser, an additional combustion furnace 16 may be provided. If this furnace is attached between the ozonizer 14 and the condenser 15 by a suitable pipe 17 through a shut-off valve 18, a sample of the ozone may be obtained for analysis. For example, if the combustion furnace 11 does not oxidize all of the oxidizable materials in the oxygen such materials as remain will appear in the output of ozonizer 14 and these materials may be oxidized in combustion furnace 16, from which samples for analysis may be withdrawn from conduit 19. The efficacy of the carbon dioxide scrubbers 12 can be tested by analyzing a sample of gas withdrawn from the line between trap 13 and ozonizer 14. To ascertain the amount, if any, of carbon dioxide in the oxygen supply, samples for test may be withdrawn from the cylinder 10.

In designing and constructing apparatus for handling oxygen and for generating and handling ozone, care should be taken to avoid substances which themselves may contaminate the ozone or the oxygen from which it is generated. Obviously such materials should be omitted from the system following the combustion furnace. These materials include certain plastics and resins, for example, Vinylite, Tygon, Lucite and Bakelite, and certain metals, such as brass, copper and magnesium. The temperatures of the material and of the gas in contact with it are factors in the effect, the higher the temperature, the more the contamination, as a rule.

The purification process as above described comprises the removal to the necessary degree from the oxygen-containing gas of combustible materials, which generally include hydrocarbons or other organic compounds, by the step of oxidizing such materials. However, it is to be understood that the invention is not limited thereto because in its broader aspect the invention resides in so treating the oxygen or free oxygen-containing gas from which ozone is to be generated, that substantially all combustible compounds or substances are removed from the gas prior to ozonization of the oxygen, or at least such a proportion is removed that the concentration of the remaining contaminant expressed in parts per million of carbon dioxide does not exceed 20, as above explained, or, in short, of generating the ozone from oxygen-containing gas which is substantially free of volatile contaminants oxidizable in ozone. For example, the proportions of mentioned contaminants may be at least greatly reduced by scrubbing the inlet air by conventional methods, or, if oxygen be employed, by passing it through liquid oxygen. Contaminants in the inlet oxygen, if the latter be in liquid form, may be adsorbed on silica gel at very low temperatures.

We claim:

1. In the method of producing concentrated ozone from gas containing free oxygen and carbon-containing contaminants which oxidize at temperatures above about 600° C. and in which the gas is passed through an ozonizer with resultant production of ozone, the steps of oxidizing the carbon-containing contaminants in said gas at a temperature above about 600° C. until such contaminants expressed as carbon dioxide have been reduced to not more than approximately 20 parts per million, by weight, to form treated oxygen, thereafter ozonizing the treated oxygen to form treated ozone, concentrating said treated ozone, and maintaining the treated gas, to and including said ozonizing step and thereafter, from contact with and from contamination by oxidizable compounds such that the amount of said contaminants in the concentrated ozone expressed as carbon dioxide is not more than approximately 20 parts per million by weight calculated on the mixture, whereby the resulting concentrated ozone is characterized by substantially decreased susceptibility to detonation.

2. The method according to claim 1 which includes oxidizing said contaminants to carbon dioxide and water and extracting the carbon dioxide and water from the treated oxygen prior to said ozonizing.

3. In the method of producing concentrated ozone from commercial oxygen which contains combustible, carbon-containing contaminants which oxidize at temperatures above about 600° C. and in which said oxygen is passed through an ozonizer with resultant production of ozone, the steps of passing the oxygen through a combustion furnace packed with an oxidizing catalyst at a temperature above about 600° C. and sufficiently elevated to remove by oxidation said combustible carbon-containing contaminants from the oxygen until said contaminants expressed as carbon dioxide have been reduced to not more than approximately 5 parts per million, by weight, to form treated oxygen, thereafter ozonizing the treated oxygen, concentrating the ozone, and maintaining the treated gas, to and including said ozonizing step and thereafter, free from contact with and from contamination by oxidizable compounds such that the amount of said contaminants in the concentrated ozone expressed as carbon dioxide is not more than approximately 5 parts per million by weight calculated on the mixture, whereby the susceptibility of said concentrated ozone to detonation is substantially decreased.

4. The method according to claim 3 which includes the step of scrubbing the treated gas which contains oxidized contaminants in a caustic solution prior to the step of ozonizing.

5. The method according to claim 3 in which the catalyst comprises a metallic oxide selected from the group consisting of copper oxide, silver oxide and magnesium dioxide.

6. The method according to claim 5 in which the furnace is maintained at a temperature between approximately 600° C. and 1,000° C.

References Cited in the file of this patent

UNITED STATES PATENTS

| | | |
|---|---|---|
| 107,071 | Loew | Sept. 6, 1870 |
| 577,523 | Andersson | Feb. 23, 1897 |
| 596,936 | Irving | Jan. 4, 1898 |
| 942,046 | Ashley | Dec. 7, 1909 |
| 1,374,237 | Rosner | Apr. 12, 1921 |

FOREIGN PATENTS

| | | |
|---|---|---|
| 550,993 | Germany | May 26, 1932 |

OTHER REFERENCES

Thode et al., Transactions of the Electrochemical Society, vol. LXIII, 1933, pp. 401 to 418, pp. 401 to 404 pertinent.